United States Patent
Banks et al.

(10) Patent No.: US 9,160,487 B2
(45) Date of Patent: *Oct. 13, 2015

(54) WIRELESS LINK TO TRANSMIT DIGITAL AUDIO DATA BETWEEN DEVICES IN A MANNER CONTROLLED DYNAMICALLY TO ADAPT TO VARIABLE WIRELESS ERROR RATES

(71) Applicant: AliphCom, San Francisco, CA (US)

(72) Inventors: Jano Banks, Cupertino, CA (US);
Jeffrey D. Boone, Sunnyvale, CA (US);
Bradley Bozarth, Mountain View, CA (US)

(73) Assignee: AliphCom, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,623

(22) Filed: Jul. 15, 2013

(65) Prior Publication Data

US 2014/0177680 A1    Jun. 26, 2014

Related U.S. Application Data

(63) Continuation of application No. 12/006,607, filed on Jan. 3, 2008, now Pat. No. 8,489,136.

(60) Provisional application No. 60/878,725, filed on Jan. 5, 2007.

(51) Int. Cl.
*H04B 7/00* (2006.01)
*H04L 1/00* (2006.01)
(Continued)

(52) U.S. Cl.
CPC .............. *H04L 1/0041* (2013.01); *H04B 1/707* (2013.01); *H04L 1/0015* (2013.01); *H04L 1/0002* (2013.01); *H04L 1/0009* (2013.01); *H04L 1/0014* (2013.01); *H04L 1/18* (2013.01)

(58) Field of Classification Search
CPC ..... H04L 1/0002; H04L 1/004; H04L 1/0061; H04L 1/0075; H04W 52/20
USPC ........... 455/39, 68, 69, 127.1, 41.2, 500, 507, 455/517, 73, 130, 522, 3.01
See application file for complete search history.

(56) References Cited

U.S. PATENT DOCUMENTS 7,194,520 B1    3/2007    Beard et al.
7,701,858 B2    4/2010    Werb et al.
(Continued)

FOREIGN PATENT DOCUMENTS

| | | |
|---|---|---|
| EP | 1457965 A2 | 9/2004 |
| WO | WO 01/99384 A2 | 12/2001 |
| WO | WO 2006/089409 A1 | 8/2006 |
| WO | WO 2008/085870 A2 | 7/2008 |

OTHER PUBLICATIONS

"HDMI," Wikipedia, http://en.wikipedia.org/windex.php?title=HDMI&oldid=96587263, Dec. 26, 2006, 6 pages.
(Continued)

*Primary Examiner* — Tuan Pham
(74) *Attorney, Agent, or Firm* — Kokka & Backus, PC

(57) ABSTRACT

A communication system including a host transceiver, one or many device transceivers, and a wireless or wired link, in which encoded digital audio data and optionally also other auxiliary data are transmitted and received between the host transceiver and one or many device transceivers. The wireless link can but need not be a Certified Wireless USB ("CWUSB") link, which utilizes WiMedia Ultra-Wideband ("UWB") radio technology. For certain embodiments, packets of encoded audio data are transmitted from a host to a device or multiple devices over the wireless link utilizing a variety of data packet transfer methods, with the host adapting its algorithms dynamically to provide the digital audio content over a changing wireless error rate environment. The host intelligently controls the method of data transmission, including data encoding format, synchronization, latency, and transmission rate, in response to data transfer error information it detects or receives from each individual device in the system. Other embodiments are devices that employ audio-data-specific error concealment methods. Other embodiments concern host and device management of graceful muting and restart of audio on a device-by-device basis.

20 Claims, 14 Drawing Sheets

(51) Int. Cl.
*H04B 1/707* (2011.01)
*H04L 1/18* (2006.01)

(56) References Cited

U.S. PATENT DOCUMENTS

| | | | |
|---|---|---|---|
| 7,855,973 B2 | 12/2010 | Bloebaum | |
| 8,489,136 B2 * | 7/2013 | Banks et al. | 455/522 |
| 2003/0231655 A1 | 12/2003 | Kelton et al. | |
| 2004/0205438 A1 | 10/2004 | Chien et al. | |
| 2004/0240575 A1 * | 12/2004 | Rainbolt | 375/267 |
| 2005/0141858 A1 | 6/2005 | Kumagai | |
| 2006/0203924 A1 | 9/2006 | Casaccia et al. | |
| 2007/0225839 A1 | 9/2007 | Nagaoka | |
| 2008/0040509 A1 | 2/2008 | Werb et al. | |
| 2008/0084330 A1 | 4/2008 | Picard | |
| 2008/0168312 A1 | 7/2008 | Banks et al. | |
| 2009/0081948 A1 | 3/2009 | Banks et al. | |

OTHER PUBLICATIONS

"HomePlug AV White Paper," HomePlug Powerline Alliance, Inc., Document version No. HPAVWP-050818, Copyright 2005, 11 pages.

"Power line communication," Wikipedia, http://en.wikipedia.org/w/index.php?title=Power_line_communication&oldid=97407632, Dec. 30, 2006, 1 page.

"S/PDIF," Wikipedia, http://en.wikipedia.org/wiki/S/PDIF, Jan. 4, 2007, 3 pages.

"Universal Serial Bus," Wikipedia, http://en.wikipedia.org/w/index.php?title=Universial_Serial_Bus&oldid=97432809, Dec. 31, 2006, 19 pages.

Johnson, R.C., "UWB Boosts HD Audio Standard," XP002539784, EE Times, http://www.eetimes.com/showArticle.jhtml?articleID=205207187, Jan. 2, 2008, 2 pages.

PCT Notification of Transmittal of the International Search Report and The Written Opinion of the International Searching Authority of the Declaration for PCT Counterpart Application No. PCT/US2008/000088 Containing International Search Report, Jul. 22, 2008, 18 pages.

Pham, Tuan, USPTO Non-Final Office Action mailed May 16, 2011, U.S. Appl. No. 12/006,607.

Pham, Tuan, USPTO Final Office Action mailed Dec. 28, 2011, U.S. Appl. No. 12/006,607.

Pham, Tuan, USPTO Non-Final Office Action mailed Sep. 6, 2012, U.S. Appl. No. 12/006,607.

* cited by examiner

WIRELESS LINK TO TRANSMIT DIGITAL AUDIO DATA BETWEEN DEVICES IN A MANNER CONTROLLED DYNAMICALLY TO ADAPT TO VARIABLE WIRELESS ERROR RATES

CROSS-REFERENCE TO RELATED APPLICATIONS

This application is a continuation of U.S. patent application Ser. No. 12/006,607, filed Jan. 3, 2008, entitled "Wireless Link to Transmit Digital Audio Data Between Devices in a Manner Controlled Dynamically to Adapt to Variable Wireless Error Rates," which claims the benefit of U.S. Provisional Patent Application No. 60/878,725, filed Jan. 5, 2007, entitled "Method and Apparatus for Reliably Transmitting, Receiving, and Repairing Audio Data Over Non-Error-Free Media to Overcome a Variety of Data Error Conditions," all of which are incorporated by reference herein in their entirety for all purposes.

FIELD

Embodiments of the invention pertain to methods and systems for transmitting and receiving encoded audio data over a wireless or wired link which is susceptible to data error occurrences. For an embodiment of the invention, the link is Certified Wireless USB ("CWUSB").

BACKGROUND

In the consumer electronics and computer industries, transmission of audio signals from a host player to remote device speakers has generally been accomplished over an analog wired interface, known commonly as speaker wires. With the advent of digital audio content, the desire to maintain the pristine digital audio signal as far as possible along the audio signal chain has motivated designers to pursue digital interfaces to replace unsightly, signal-loss-prone analog speaker wires.

Digital audio data can be transferred between devices utilizing physically connected (wired or optical-link) interfaces or wireless interfaces. Interfaces such as Sony/Philips Digital Interface Format ("SPDIF") carry 2-channel uncompressed audio data or multi-channel highly-compressed audio data, and utilize a wired or optical medium which is expected to yield no data errors in transmission. These interfaces are generally limited to short cable lengths to maintain error-free transmission. Because these links are expected to be error-free, the audio data which they carry is encoded with simple error detection or no error detection at all, and no error correction. As a result of these limitations, SPDIF interfaces are not well-suited to replace analog speaker wires.

To enable the transmission of multi-channel uncompressed audio, and lossless, or minimally-lossy multi-channel compressed audio, the need for higher-bandwidth interfaces becomes necessary. High-speed wired serial links, such as HDMI and USB, have bandwidth capabilities to carry higher audio data rates, but these interfaces are non-error-free, with packet error rates of $10^{-9}$ for minimal compliance to their specifications. With this admission of even highly occasional errors, the possibility of audio interruption (periods of time with no audible sound) or audio disturbances (audible pops and cracks) is introduced. USB has no error correction encoding for audio, and therefore, when the link fails, audio is either interrupted or disturbed, making analog speaker wires preferable to most. Also, a topology allowing multiple USB speakers, each of which is digitally interconnected, requires a USB host to USB hub with enough ports to accommodate the number of USB speakers in the system, and a USB cable between each speaker and the hub. Because audio is often played alongside "lip-synched" video, concerns about audio latency and speaker synchronization after going through the multiple levels of the above topology also becomes a concern. HDMI concurrently carries both digital video and audio, and thereby can avoid lip-sync concerns, has enough bandwidth, and employs error correction methods for audio to enable systems that carry high quality, multi-channel audio that does not introduce audio interruption or disturbances. However, to enable HDMI digital audio transmission to remote speakers requires a topology somewhat similar to that described above for USB. HDMI source to speaker systems would require a separate HDMI transmitter for each speaker's HDMI receiver, with an HDMI cable between each pair. This quickly becomes quite costly for systems which support 6 or 8 speakers. To cover distances that would be required for surround speakers, HDMI cables generally need to be thicker, making them cumbersome and costly, and HDMI source to speakers systems quickly become less compelling compared to analog speaker wires.

To solve the above problems, wireless interconnects, or "invisible" wired interconnects, such as HomePlug power line communications, become desirable. Wireless or Home-Plug systems, however, provide lower bandwidth than HDMI, and have higher, and more variable data error rates than HDMI. But, they have the large advantage of removing the visible audio transmission wires while maintaining pristine digital audio.

Many wireless media could be used for audio, such as infra-red (IR) and consumer radio frequency (RF) systems, but most suffer from limited bandwidth, insurmountable interference, restrictive line-of-sight, and/or lip-sync-compromising latency requirements.

FIG. 1 shows an example of a conventional prior art audio video system, comprised of a source (HDMI DVD player 8) connected via an HDMI cable to an audio-video receiver (HDMI AV Rx 9) connected via an HDMI cable to a display (HDMI TV 22). The HDMI AV Rx 9 is also connected via analog speaker wires to a set of 6 speakers (1-6), each connected point-to-point from the HDMI AV Rx 9. Speakers in FIG. 1 are identified as follows: Front Left (FL) 1, Front Right (FR) 2, Center (C) 5, Surround Left (SL) 3, Surround Right (SR) 4, and Low Frequency Effect (LFE) 6, also commonly referred to as a "subwoofer." This conventional system contains components which can maintain pristine digital audio and video from source to display through HDMI interconnects, but from the AV Rx 9 to the speakers 1-6, the interconnect is still analog, via conventional speaker wires. With such a system containing 6 individual speakers, and other, more advanced systems which support up to 8 speakers or more, the speaker wire interconnections not only suffer from analog signal loss, but they can cause quite an eyesore or minimally a wire-hiding challenge, especially for those speakers intended to be located far from the source, such as the Surround Left (SL) 3 and Surround Right (SR) 4 speakers.

SUMMARY

A communication system is described that includes a host transceiver, one or many device transceivers, and a wireless or wired link, in which encoded digital audio data and optionally also other auxiliary data are transmitted and received between the host transceiver and one or many device transceivers. The wireless link can but need not be a Certified Wireless USB ("CWUSB") link, which utilizes WiMedia Ultra-Wideband ("UWB") radio technology. For certain embodiments, packets of encoded audio data are transmitted from a host to a device or multiple devices over the wireless link utilizing a variety of data packet transfer methods, with the host adapting its algorithms dynamically to provide the digital audio content over a changing wireless error rate environment. The host intelligently controls the method of data transmission, including data encoding format, synchronization, latency, and transmission rate, in response to data transfer error information it detects or receives from each individual device in the system. Other embodiments of the invention are devices that employ audio-data-specific error concealment methods. Other embodiments concern host and device management of graceful muting and restart of audio on a device-by-device basis.

Other features and advantages of embodiments of the inventions will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

An embodiment of the invention is a wireless system with a scalable, adapting approach designed to overcome the specific error characteristics of each RF communication link utilized to carry uncompressed digital audio data, resulting in a system which can provide virtually interrupt and disturbance-free, high-quality, low-latency, multi-channel digital audio to speakers without utilizing audio transmission wires. The RF interface chosen for the described embodiment is Certified Wireless USB (CWUSB), which is built upon WiMedia Ultra-Wideband (UWB) radio communications technology.

Figure 1:
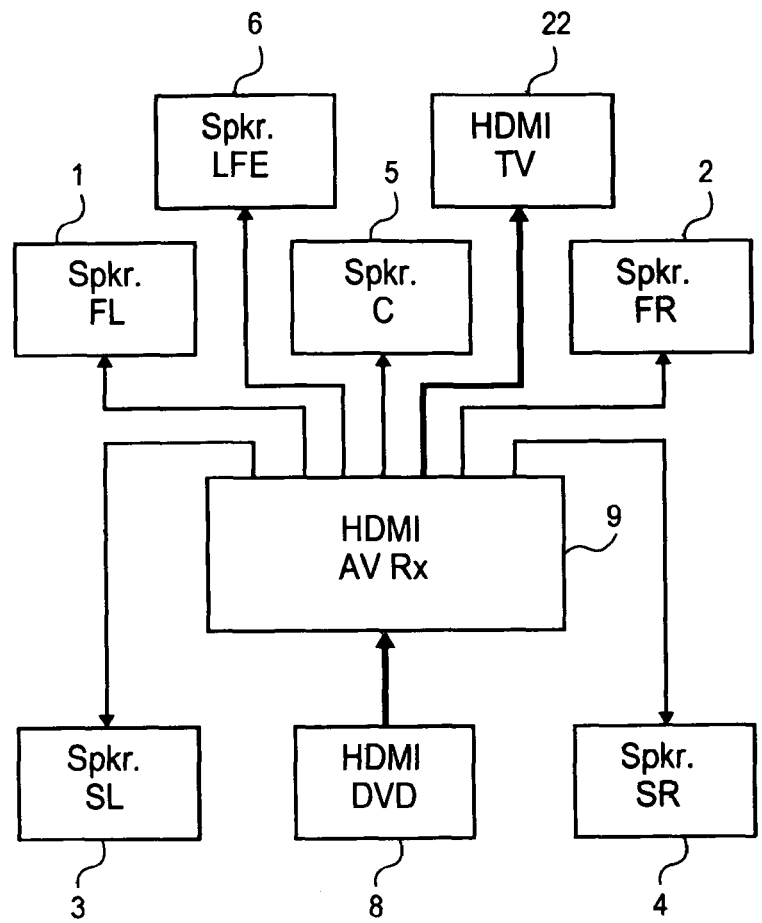
FIG. 1 is a block diagram of an example of a conventional prior art audio video system with analog speaker wires.
Figure 2:
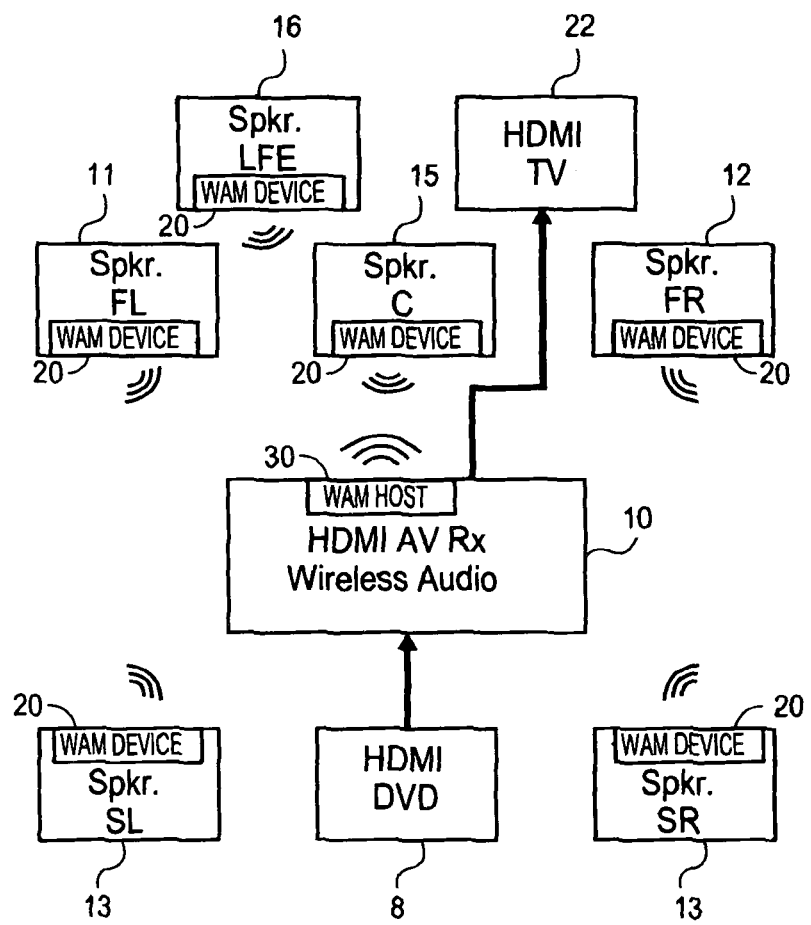
FIG. 2 is a block diagram of FIG. 1's audio video system with an embodiment of the invention utilizing CWUSB for the wireless link replacing analog speaker wires.

FIG. 2 shows an embodiment of the invention. FIG. 2 shows a system similar to that of FIG. 1, but with the speaker wire connections replaced with a wireless topology. Added to each of the speakers 1-6 and the HDMI AV Rx 10 is a small block noted as Wireless Audio Module ("WAM") Device 20 inside each speaker, and WAM Host 30, one in the system, contained in the HDMI AV Rx 10. Note that the topology is point-to-multi-point, implemented via the CWUSB Host/Device architecture. Also noteworthy is the ability for bidirectional communications over the wireless link, as depicted with the wireless beacon-like icons. The wireless beacon icon of WAM Host 30 is noted as larger than the device wireless icons to indicate that the majority of the data transferred in such an audio application is from Host 30 to Devices 20, but very important, infrequent data is sent from the Devices 20 to the Host 30, communicating acknowledgements of data transfers and application-specific information, such as packet reception reliability statistics. Such bidirectional communication is also quite useful to enable detection of devices, which allows for many ease-of-use capabilities, such as auto-configuration of the audio system optimized to the speakers available for output. And, of course, the absence of speaker wires enables a simpler-to-setup, less cluttered environment, and allows for the pristine digital audio content to reach the speakers with no signal loss.

Figure 3:
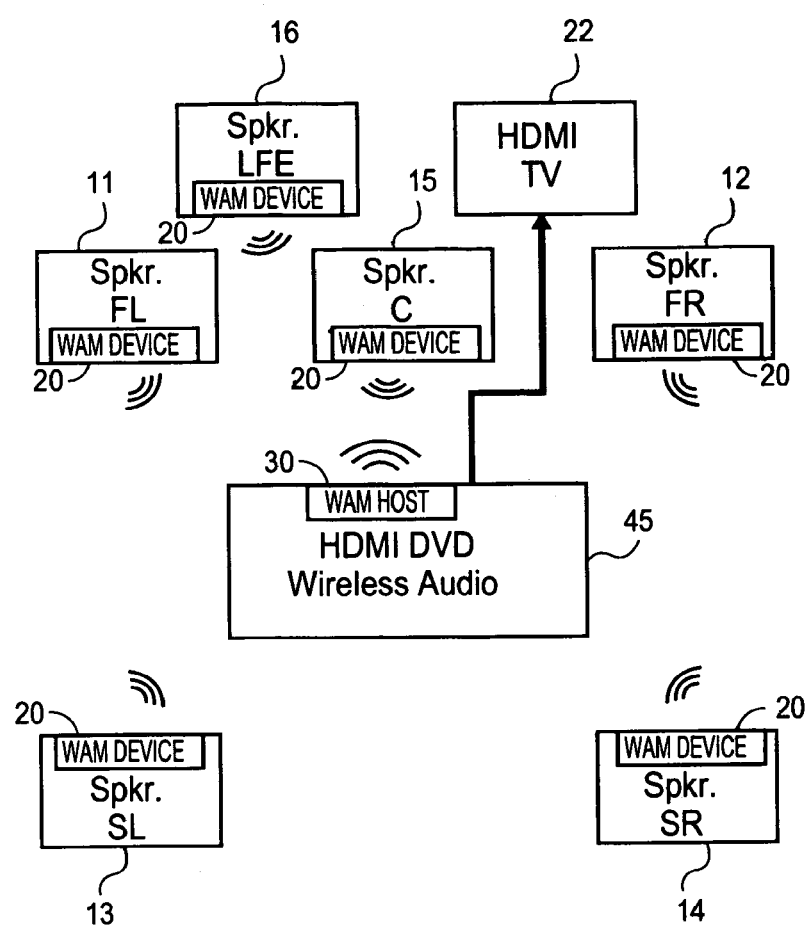
FIG. 3 is a block diagram of an audio video system with an embodiment of the invention allowing removal of the AV Receiver via consolidation into the DVD player.
Figure 4:
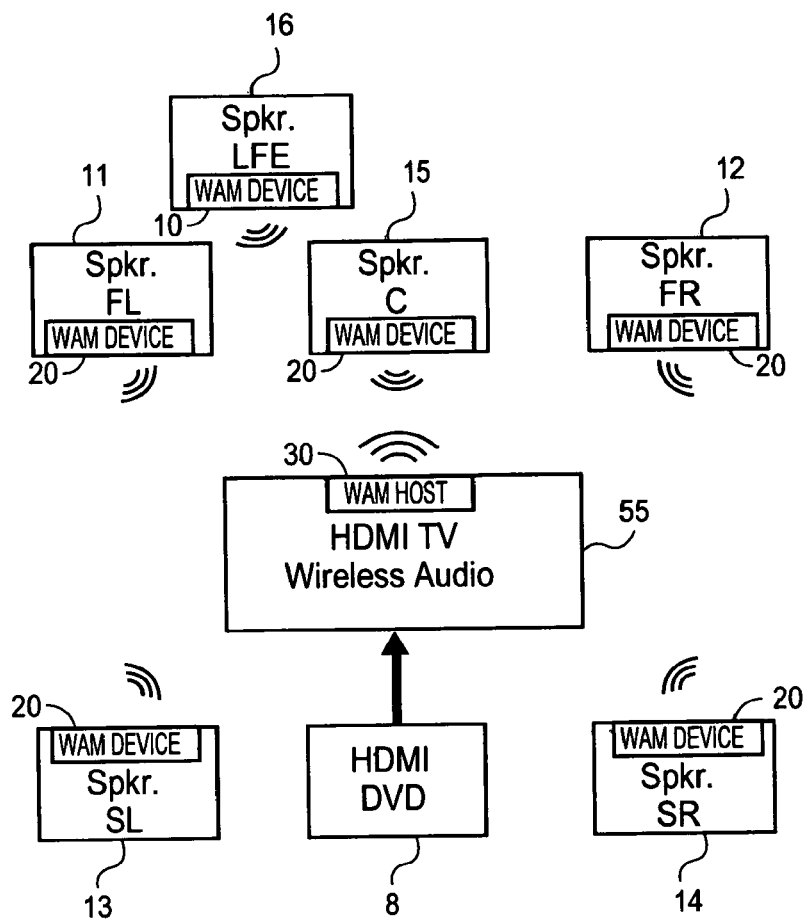
FIG. 4 is a block diagram of an audio video system with an embodiment of the invention allowing removal of the AV Receiver via consolidation into the TV.

As the wireless audio topology reduces clutter in FIG. 2, it also enables interesting consolidation of devices and multiple locations of the WAM Host 30, as shown in FIG. 3 and FIG. 4. In each of these figures, the AV Rx separate component has been combined with an HDMI DVD player 45 (FIG. 3) or an HDMI TV 55 (FIG. 4). This consolidation is possible with the wireless audio topology because a major portion of the AV Rx, the centralized amplifier for the speakers, has been effectively distributed to each of the speakers. With this often large and heat-producing section removed from the core components, replaced with a single WAM Host 30, it is suddenly possible to economically create multi-channel audio output capabilities from a DVD player, and, for the first time, such a host can reside inside the TV chassis. Even better, neither the DVD player nor the TV need to add any extra connectors to provide such support, as the capability is made available via a wireless system.

Figure 5:
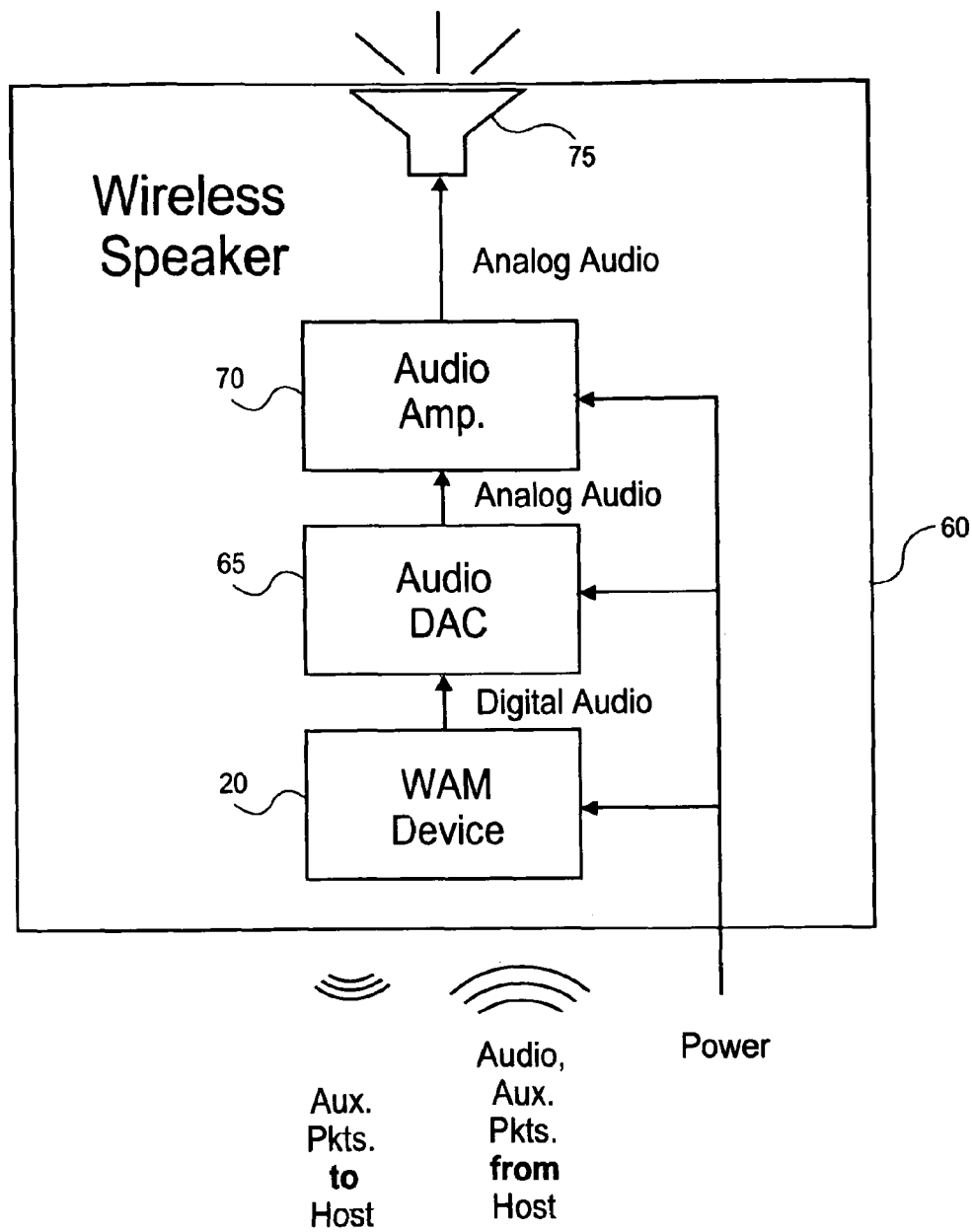
FIG. 5 is a block diagram of a wireless speaker system with an embodiment of the invention.

To expand upon the effective distribution of the conventional centralized amplifier, it is helpful to understand the internals of a Wireless Speaker subsystem 60, an example of which is shown in FIG. 5. The Wireless Speaker 60 contains 4 major blocks: the WAM Device 20, which receives the wireless audio data and auxiliary packets from a WAM Host 30 as well as sends back auxiliary information to the host, as required; the Audio Digital-to-Analog Converter (DAC) 65, which takes in the digital audio data from the WAM device 20, and converts it to analog. This analog line-level signal is then sent to the Audio Amplifier 70, which can be specifically designed to match the loudspeaker driver 75, as the audio amplifier 70 is resident in the same enclosure as the driver 75 in this topology. Power is specifically noted in this block diagram, to remind us that there is a need for power in the wireless speakers, to allow the active electronics to be powered, as well as allocating sufficient power for the Audio Amplifier 70 performance desired for the subsystem.

Figure 6:
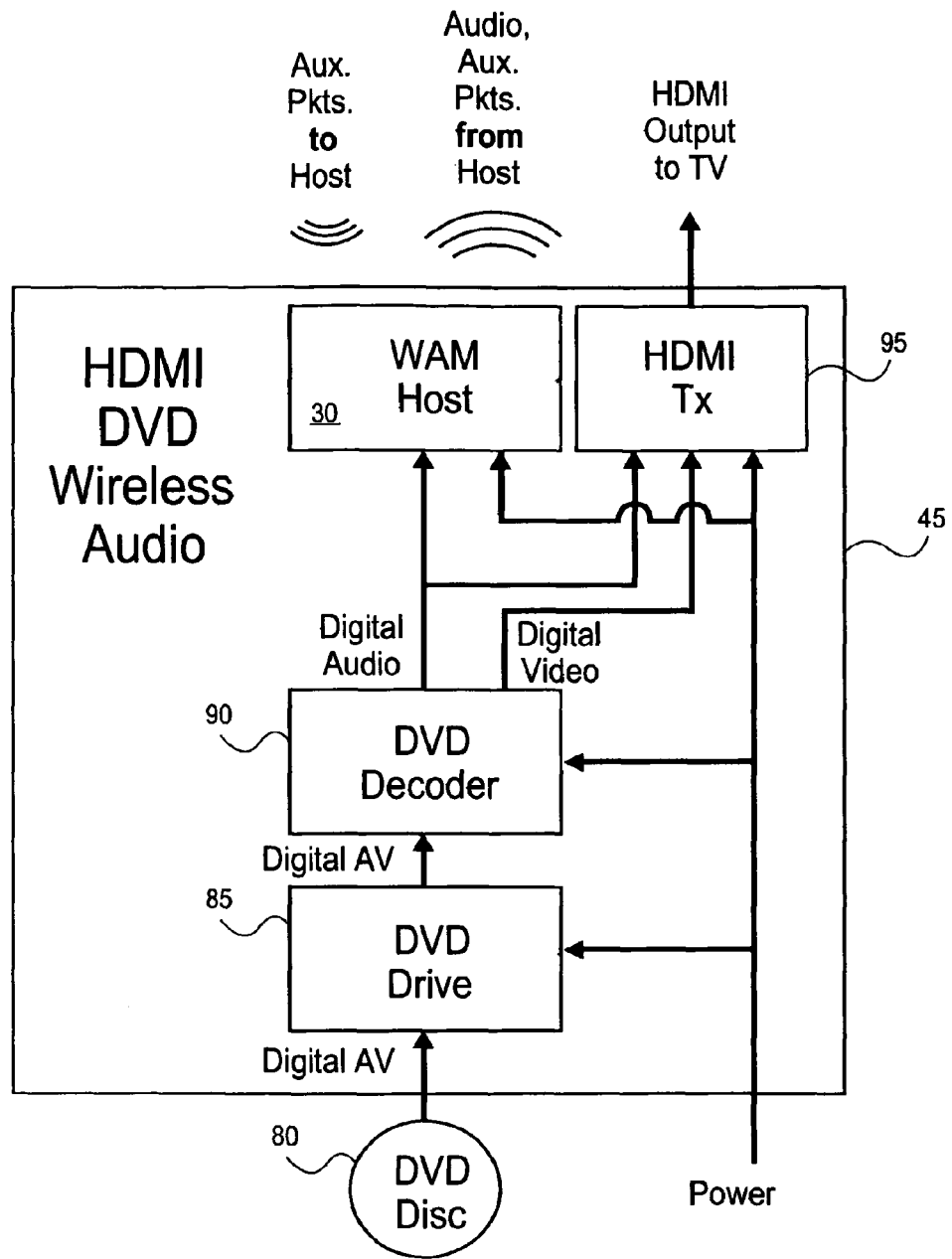
FIG. 6 is a block diagram of an HDMI DVD player with an embodiment of the invention.

FIG. 6 shows the internals of a host 45, in this example, an HDMI DVD player with Wireless Audio capabilities. Here, the digital audio video source is the DVD Disc 80, whose data is extracted via the DVD Drive 85, and then decoded in the DVD Decoder 90, which creates separate video and audio outputs. The Digital Video output goes only to the HDMI Transmitter (Tx) 95, whereas the Digital Audio is sent to both the WAM Host 60 and the HDMI Tx 95. This topology reminds us that video and audio in such arrangements are effectively synchronized at this point, and the HDMI link introduces effectively no latency for its video and audio going to a display, for example, so the wireless audio must meet acceptable latencies, else the system may exhibit annoying lip-sync issues.

Figure 7:
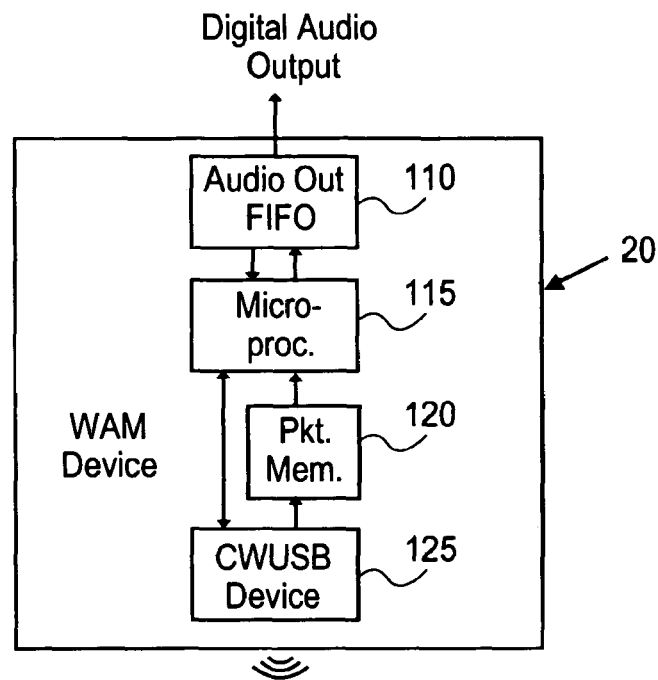
FIG. 7 is a block diagram of a Wireless Audio Module (WAM) Device.
Figure 8:
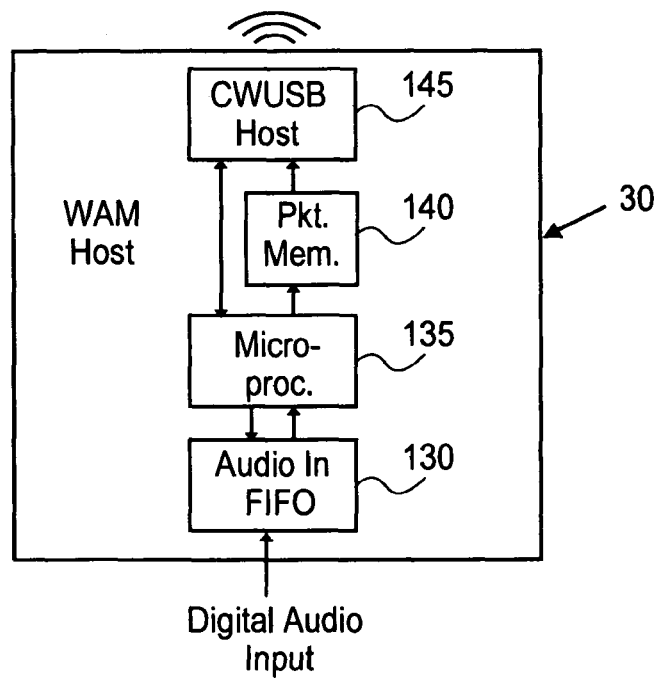
FIG. 8 is a block diagram of a WAM Device.

FIG. 7 shows the internals of a WAM Device 20. FIG. 8 shows the internals of a WAM host 30. These high-level block diagrams are effectively identical, but with reversed signal processing order between the WAM Host 30 and WAM Device 20. The internal blocks of WAM Device 20 of FIG. 7 comprise an Audio Out FIFO (First In First Out) 110, a microprocessor 115, a memory 120 allocated for packet storage, and a CWUSB Device 125. The internal blocks of WAM Host 30 of FIG. 8 comprise an Audio In FIFO 120, a Microprocessor 125, a memory 130 allocated for Packet storage, and a CWUSB Host 135. The system takes in Digital Audio, sends it wirelessly over CWUSB, and produces Digital Audio output from each WAM Device 20. The Microprocessor included in each WAM embodiment (e.g., Microprocessors 115 and 135) must perform sophisticated management and execute complex algorithms tailored to the wireless medium and the dynamic system requirements. The WAM Host 30 must process and transmit all digital audio channels, although a WAM Device 20 might only consume a single audio channel. The WAM Host 30's management of communications, data routing, and synchronization for all the audio channels supported in a system is a significant task.

Figure 9:
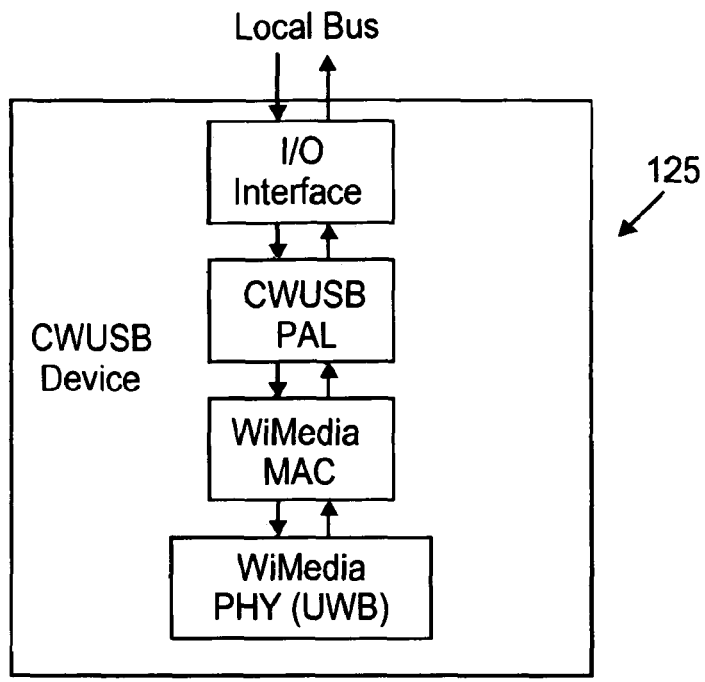
FIG. 9 is a block diagram of a prior art CWUSB Device.
Figure 10:
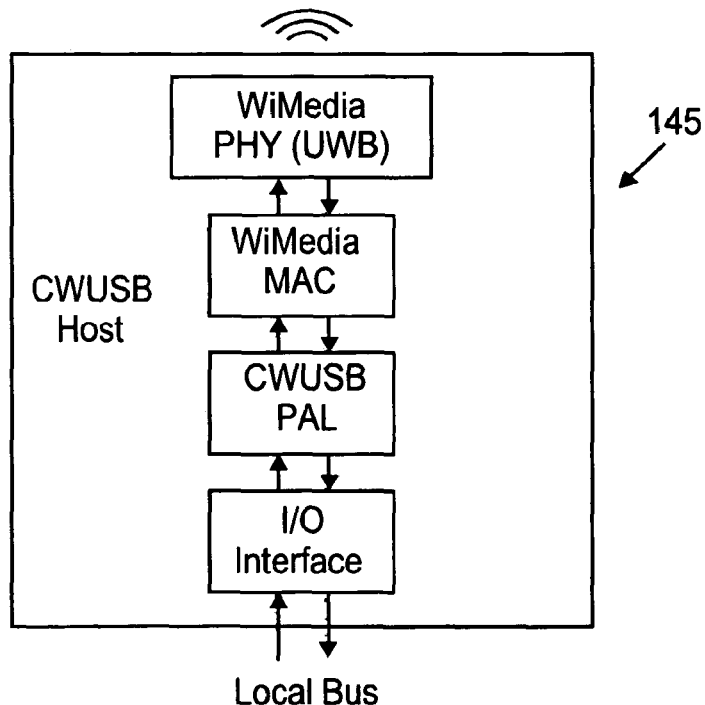
FIG. 10 is a block diagram of a prior art CWUSB Host.

For reference, FIG. 9 shows the internals of a CWUSB Device 125. FIG. 10 shows the internals of a CWUSB Host 145. The CWUSB Device 125 is a subblock of WAM Device 20 of FIG. 7. The CWUSB Host 145 is a subblock of WAM Host 30 of FIG. 8. FIGS. 9 and 10 show prior art, as described in the CWUSB Specification. These block diagrams are provided for completeness.

As mentioned earlier, the absence of speaker wires enables a simpler-to-setup, less cluttered environment, and allows the pristine digital audio content to reach the speakers with no signal loss. No signal loss assumes that the wireless interface is without error. All wireless interfaces known to date exhibit errors, including CWUSB. Therefore, to provide a robust system that offers performance comparable or superior to speaker-wire-based systems, we must provide methods to overcome the practically guaranteed occurrence of data errors in the wireless medium. However, for audio data, the analysis of the error characteristics is quite important, and for each wireless medium, a specific set of algorithms may be necessary.

Figure 11:
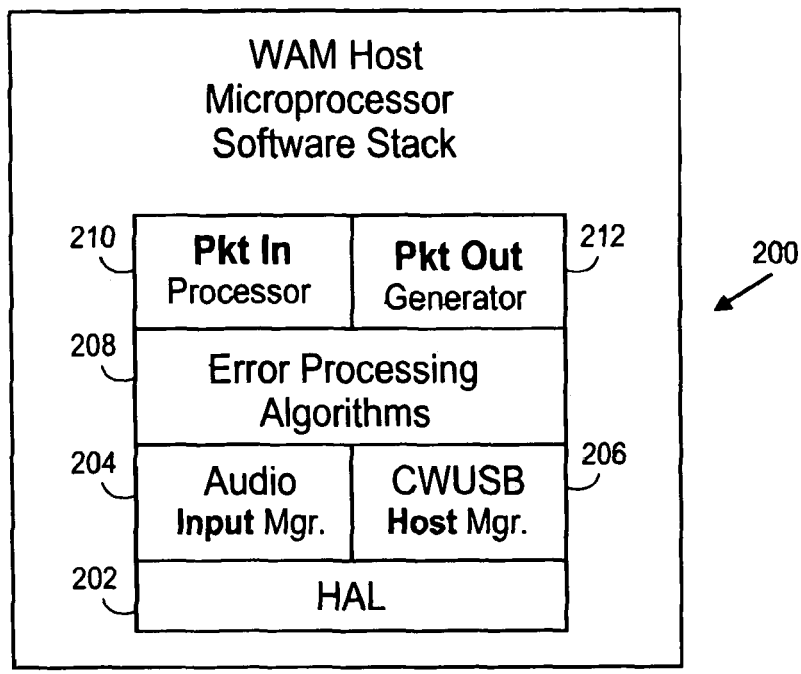
FIG. 11 is a software stack diagram for the microprocessor software in a WAM Host.
Figure 12:
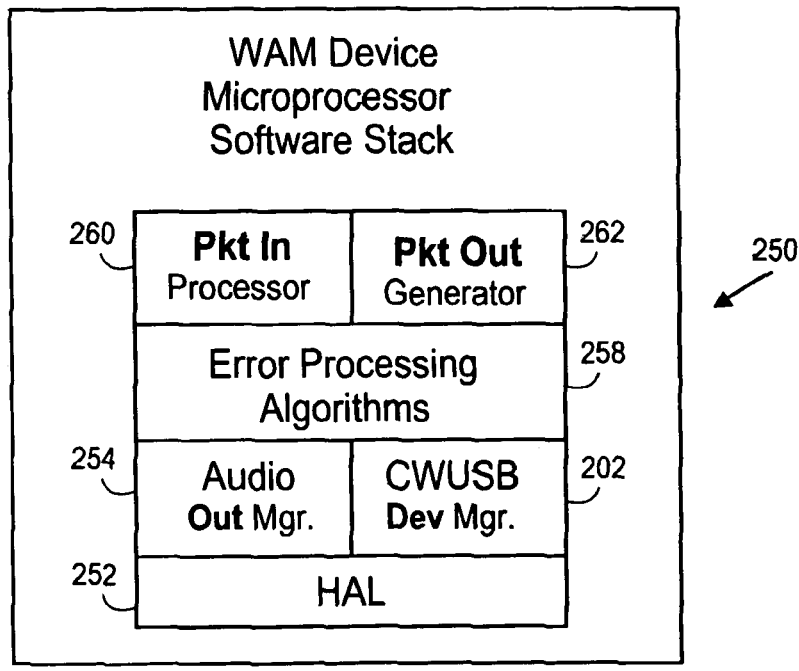
FIG. 12 is a software stack diagram for the microprocessor software in a WAM Device.

For the embodiment utilizing CWUSB as the wireless medium, a WAM Host Microprocessor Software Stack 200 is shown in FIG. 11 and a WAM Device Microprocessor Stack 250 is shown in FIG. 12. The WAM Host Microprocessor Stack 200 and the WAM Device Microprocessor Software Stack 250 are, at a high level, effectively identical. The WAM Host Microprocessor Software Stack 200 has a Hardware Abstraction Layer ("HAL") 202 to allow for support of multiple hardware implementations. Likewise, the WAM Device Microprocessor Software Stack 250 has a Hardware Abstraction Layer ("HAL") 252 to allow for support of multiple hardware implementations. For the WAM Host Microprocessor Software Stack 200, the Audio Input Manager 204 and the CWUSB Host Manager 206 live above the HAL 202. Likewise, for the WAM Device Microprocessor Software Stack 250, the Audio Output Manager 254 and the CWUSB Device Manager 256 live above the HAL 252.

The WAM Host Microprocessor Software Stack 200 includes Error Processing Algorithms 208. The WAM Device Microprocessor Software Stack 250 includes Error Processing Algorithms 258. In a sense, everything is "easy" until a data transmission error occurs. The key is not only detecting whether an error has occurred, but what to do about it. The WAM Host Error Processing Algorithms 208 comprise proactive forward error correction coding ("FECC") designed specifically for the error characteristics of the medium, and uncompressed audio as the payload. The WAM Device Error Processing Algorithms 258 utilize the FECC when they can correct an error, but the majority of this function in the WAM Device 20 is dedicated to audio error concealment methods, including graceful muting and restarting of audio.

The WAM Microprocessor Software Stack 200 includes a Packet Input Processor 210 and a Packet Output Generator 212. The WAM Device Microprocessor Software Stack 250 includes a Packet Input Processor 260 and a Packet Output Generator 262. Because both the WAM Host 30 and WAM Device 20 both send and receive data, they both contain a Packet Input Processor and a Packet Output Generator. It is here where the wireless-medium-appropriate forward error correction encoding is defined in the WAM Host 30, and the WAM Device 20 must correctly identify the error correction scheme used, and perform the appropriate decoding.

Figure 13:
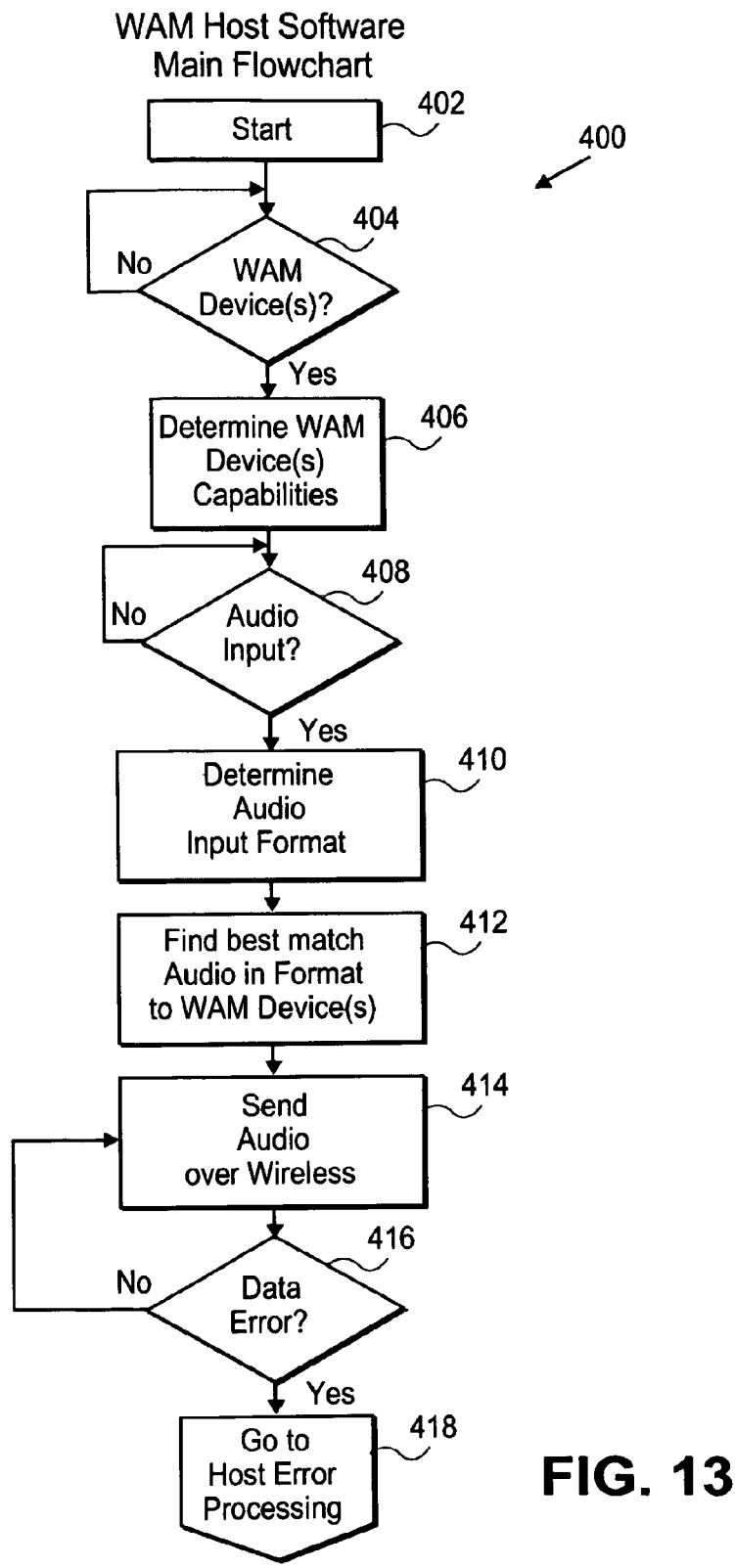
FIG. 13 is a software flow chart diagram of the Main routine of the WAM Host Software with an embodiment of the invention.

FIG. 13 shows the high-level Software Flowchart 400 for the WAM Host 30 Main routine. The software starts at operation 402 and proceeds to operation 404, which is a software loop that looks for a WAM Device 20 until one is found, and, if more than one is found, the software loop continues to find each WAM Device 20 in the system. For each WAM Device 20, once the WAM Device 20 is found, at operation 406 the software determines the capabilities of the WAM Device 20. This operation is then repeated for each WAM Device 20 found in the system, resulting in a data structure that contains the audio output capabilities of each WAM Device 20 found in the system. The audio output capabilities of a WAM device 20 are defined by its audio format support, which comprises a multiplicity of characteristics describing the digital audio samples to be sent to the WAM Device 20, including, but not limited to, sampling frequency, the number of audio channels the WAM Device 20 can play, the spatial location of said audio channels, and the number of bits of resolution the WAM Device 20 supports per digital audio sample.

The software then proceeds to operation 408, which is a loop looking for audio input. Once audio input is found, the software at operation 410 determines the audio input format. The audio input format comprises a multiplicity of characteristics describing the incoming digital audio samples, including, but not limited to, sampling frequency, number of audio channels in the input stream, intended spatial destination of said audio channels, and number of bits of resolution per digital audio sample.

At operation 412, the software analyzes the audio input format characteristics, as determined in operation 410, and the audio output capabilities of each WAM Device 20, as determined in operation 406, and either finds a match between the audio input format being sent and the audio output capabilities of each WAM Device 20, or the software applies audio format conversion to the audio stream intended for each WAM Device 20 resulting in an audio sample that matches the audio output capabilities of the WAM Device 20.

At operation 414, the audio signal is transmitted from the WAM Host 30 in a wireless manner to each WAM Device 20. At operation 416, a check is made as to whether there is a data error. An example of such a detection mechanism would be an analysis of a communication from a WAM Device 20 to a WAM Host 30 that included acknowledgement of data transfers and application specific information. If there is no data error found at operation 416, then process flow returns to operation 414, which is the sending of audio data wirelessly from the WAM Host 30 to each WAM Device 20.

Figure 14:
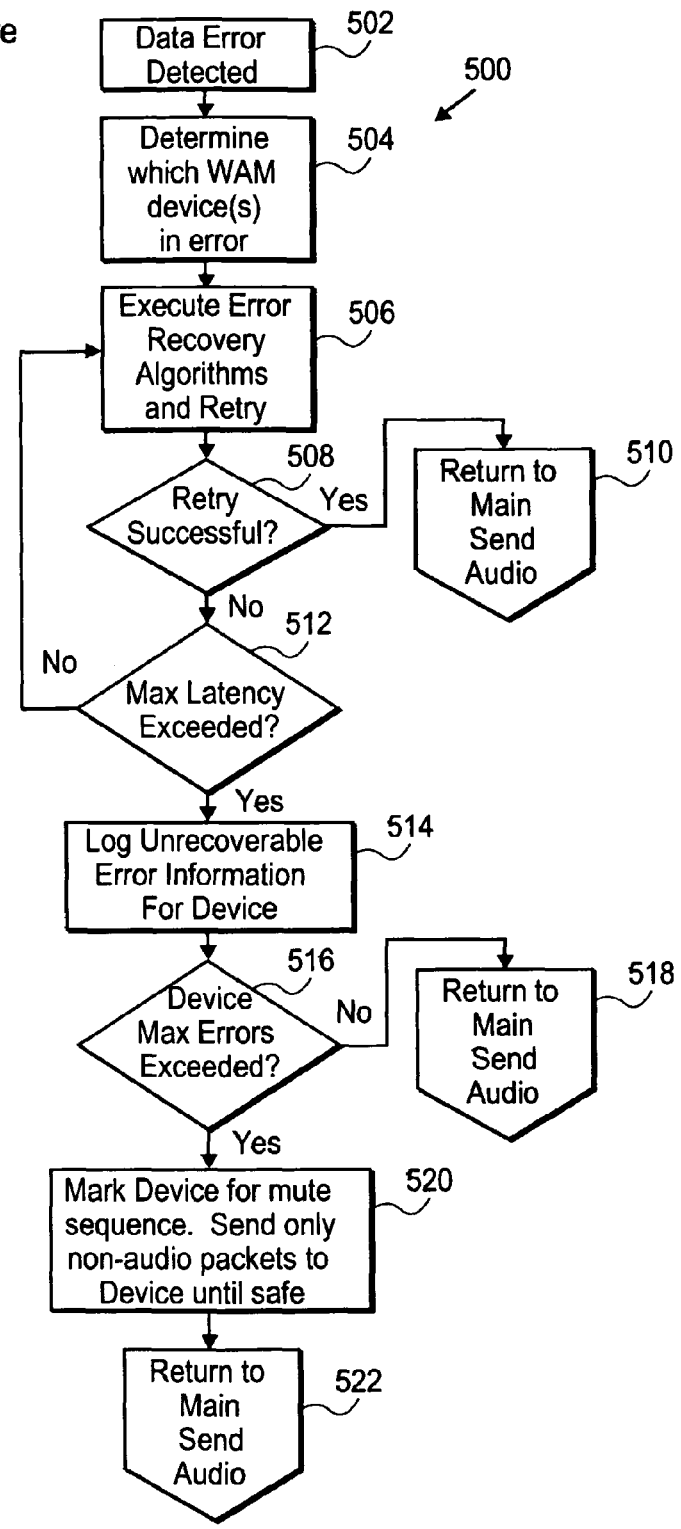
FIG. 14 is a software flow chart diagram of the Error Processing routine of the WAM Host Software with an embodiment of the invention.

If, however, a data error is found at operation 418, which is an operation that goes to host error processing. The problem becomes more interesting when an error occurs, and the WAM Host Software Error Processing Flowchart 500 shown in FIG. 14 would be invoked by operation 418. FIG. 14 shows how retries can be utilized, until maximum latency is reached, and, in the worst case, how to gracefully mute a device, but continue to send it non-audio packets to determine when it is safe to restart audio to the device. Part of effectively achieving non-interrupted, non-disturbed audio is utilizing all wireless speaker resources available in the system. If one or more speakers suddenly cannot be used, due to insurmountable wireless communication errors, the system can be intelligently reconfigured to provide the audio that would have gone to the temporarily disabled speakers to other operable speakers, and, if done well, it may be difficult for many to notice the change.

The WAM Host 30 error processing software flow 500 shown in FIG. 14 proceeds as follows. At operation 502, a data error is detected. At operation 504, a determination is made as to which WAM Device 20 is in error, and the specific characteristics of the error occurrence are logged, including, but not limited to, the data encoding format in use, the time the error occurred, and the data transmission rate in use. At operation 506, error recovery algorithms are executed, resulting in an audio transmission retry being instituted. The error recovery algorithms are dynamically chosen, taking into account a multiplicity of statistics including, but not limited to, (1) how many loops have already occurred, defined by the sequence of error recovery and retry in 506 to retry success checks in 508 to maximum latency checks in 512 back to 506; (2) the error occurrence characteristics from operation 504; (3) the statistical history of errors of WAM Device 20 from operation 504; and (4) the time remaining in the maximum latency window to successfully transfer the audio sample to maintain synchronization with the other WAM Devices 20 in the system outputting audio. At this point the appropriate recovery algorithm in operation 506 is chosen and applied to provide the determined best chance for the retry to become successful.

The error recovery algorithms can utilize a multiplicity of dynamic controls to improve the chances of the retry to be successful, including, but not limited to, (1) performing an audio data sample rate conversion and/or a reduction in audio bits-per-sample, resulting in an audio data encoding format with a reduced amount of data for the audio sample, which allows more retries to occur in the remaining maximum latency window; (2) reducing the wireless transmission rate to a level that can produce a higher transmission success rate; and (3) applying different error correction code (ECC) algorithms to the data, which can increase the effective transmission success rate through error correction.

The final stage of operation 506 is to issue a transmission retry. A test is made at operation 508 to determine if the retry was successful. If so, then operation 510 is invoked, which is a return to the main operation of sending audio wirelessly from the WAM Host 30 to the WAM Device 20.

If, however, the retry at operation 508 was not successful, then flow proceeds to operation 512, which is a check to see if the maximum latency has been exceeded. If the maximum latency has not been exceeded, then flow loops back to operation to 506, which will execute the next chosen error recovery algorithm and another retry operation. If the maximum latency has been exceeded, then operation 514 is invoked, which is the logging of unrecoverable error information for the WAM Device 20.

At operation 516, a check is made to see if the maximum number of errors associated with a WAM Device 20 has been exceeded. If not, then flow proceeds to operation 518, which is a return to the main procedure of sending audio data from the WAM Host 30 to the WAM Device 20. If, however, the maximum number of errors for the WAM Device 20 has been exceeded, then flow proceeds to operation 520. At operation 520, the WAM Device 20 is marked for a mute sentence. At operation 520, the WAM Device 20 is sent only non-audio packets by WAM Host 30 until a safe condition is reached. A safe condition is reached when the WAM Host 30 determines that the non-audio packets sent from WAM Host 30 to WAM Device 20 have met a successful transmission rate percentage that the WAM Host 30 has determined is statistically high enough to mark the WAM Device 20 for an un-mute sequence to gracefully resume reception of audio packets and audio output. Process flow then goes to operation 522, which is a return to the main procedure of sending audio data from the WAM Host 30 to the WAM Device 20.

Figure 15:
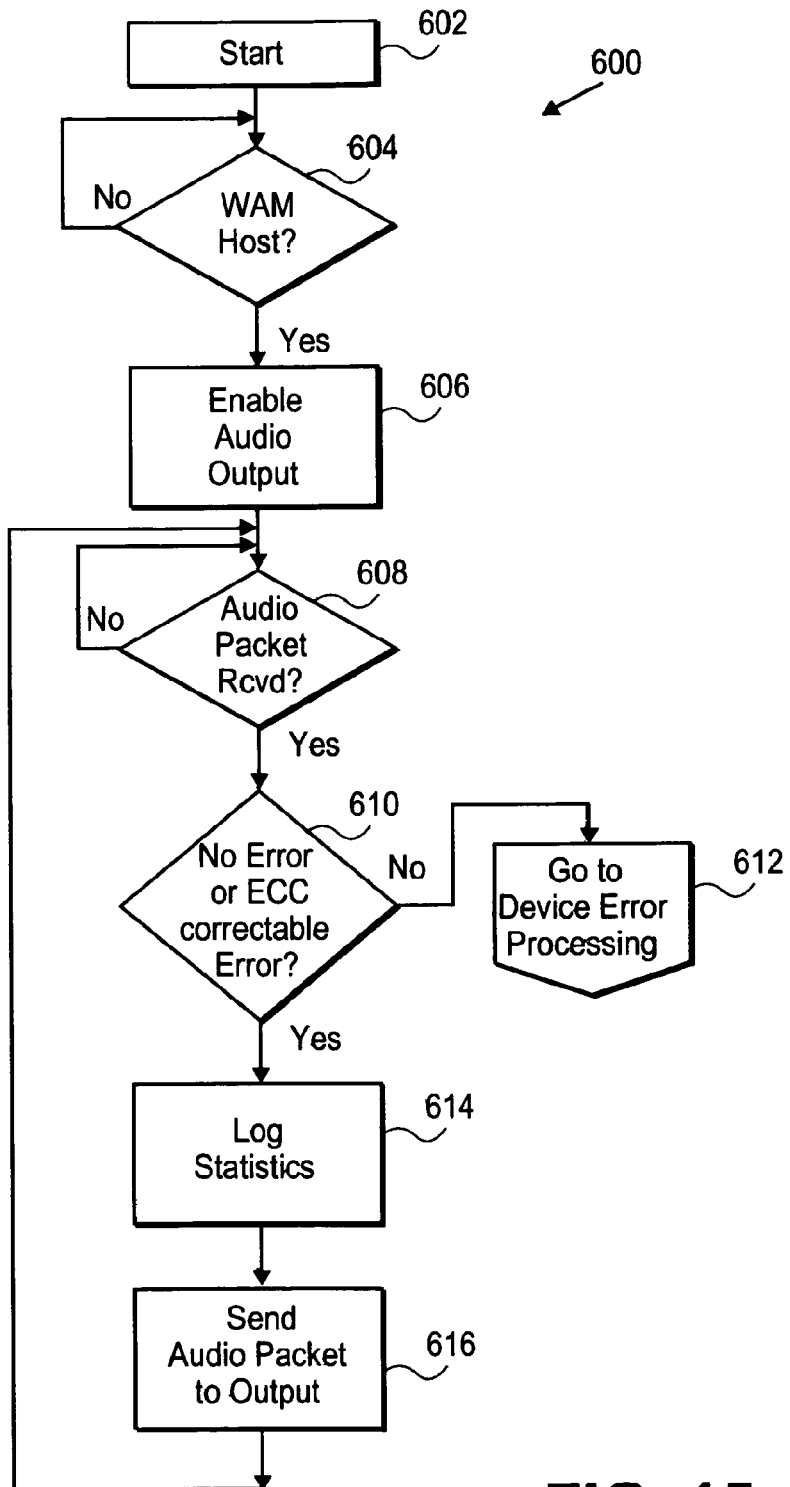
FIG. 15 is a software flow chart diagram of the Main routine of the WAM Device Software with an embodiment of the invention.
Figure 16:
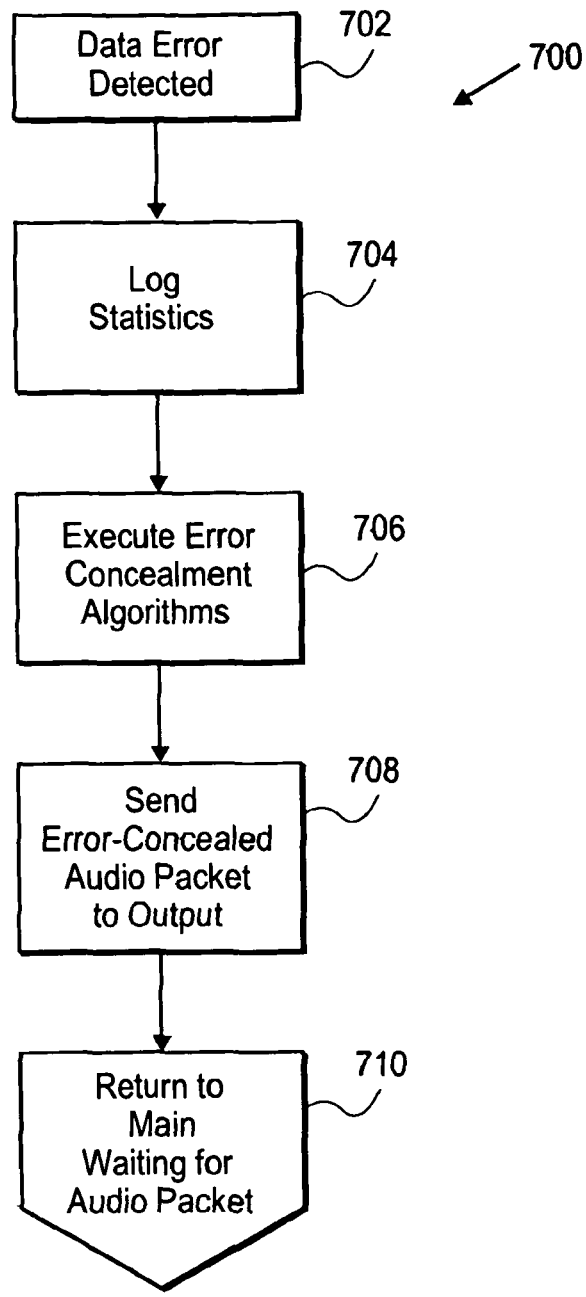
FIG. 16 is a software flow chart diagram of the Error Processing routine of the WAM Device Software with an embodiment of the invention.

FIGS. 15 and 16 provide the respective Main and Error Processing Software Flowcharts 600 and 700 for the WAM Device 20. As mentioned earlier, the WAM Device 20's Error Processing main focus is error concealment. Methods can vary in sophistication for error concealment, ranging from simple repeat-last-good-sample to sophisticated curve matching to create the missing sample. In the worst case, the result of the Error Concealment Algorithms will be a graceful mute of the device, when it is determined that missing sample creation is no longer possible. A key to the WAM Device 20's software implementation is the logging of statistics of data. This information can be queried by the WAM Host 30 to determine the wireless environment characteristics, and to allow for intelligent reconfiguration of the system to reduce the overall effective error rate.

The WAM Device 20 software main flow 600 shown in FIG. 15 proceeds as follows. After the start operation 602, flow proceeds to operation 604, which is a loop that checks for a receipt of a wireless transmission from the WAM Host 30. Once a wireless transmission from the WAM Host 30 is detected, flow proceeds to operation 606, which is the enablement of the audio output from the WAM Device 20.

Operation 608 is a loop that checks for the receipt by the WAM Device 20 of a packet from the WAM Host 30. Once an audio packet is received, flow proceeds to operation 610, which is check to see whether there is either an error or an error correctable with an error correction code (ECC). If the error cannot be corrected with or without an ECC, then flow proceeds to operation 612, which is a go to operation that proceeds to WAM Device 20 error processing. If the error can be corrected or corrected by using an ECC, then flow proceeds to operation 614, wherein statistics are logged.

At operation 616, an audio packet is sent to an output of the WAM Device 20. Flow then proceeds to operation 608, which is the check for reception by the WAM Device 20 of another audio packet sent by the WAM Host 30.

The WAM Device 20 software error processing flow 700 shown in FIG. 16 proceeds as follows. At operation 702, a data error is detected. At operation 704, statistics are logged. At operation 706, error concealment algorithms are executed. At operation 708, an error-concealed audio packet is sent to an output of the WAM Device 20. At operation 710, there is a return to the main process flow of waiting for an audio packet to be received by the WAM Device 20.

Figure 17:
FIG. 17 is a table showing the bandwidth requirements for different uncompressed audio formats.

The requirements of a wireless system to carry multi-channel, uncompressed audio are noted below. FIG. 17 is a table 800 that notes the bandwidth requirements for different uncompressed digital audio formats.

Minimal requirements for a wireless medium to meet the needs of an embodiment of the invention:

| | |
|---|---|
| Bandwidth | 20 Mb/s (40 Mb/s desired) |
| Latency | <20 mS |
| Interference (QOS) | Avoid 2.4 GHz |
| Distance | 10 Meters |
| Obstructions (Line of Sight) | Through 1 wall, 10 people |
| Association Model | Have one. Not cumbersome. |

CWUSB meets the above in the following ways:

| | |
|---|---|
| Bandwidth | 110 Mb/s |
| Latency | As low as 4 mS, with 8 mS guaranteed |
| Interference (QOS) | UWB is between 3 GHz and 10 GHz, avoiding 2.4 GHz |
| Distance | 110 Mb/s over 10 M fits whole-room audio model |
| Obstructions (line of sight) (people etc.) | UWB demonstrated in high RF clutter environments |
| Association Model | CWUSB defines a robust association model. |

CWUSB employed in the CWUSB Device 125 of FIG. 7 and the CWUSB Host 145 of FIG. 8 contains protocol features that can be used effectively in the Error Processing Algorithms. The following protocol features can be utilized in an embodiment of the invention:

Isochronus Data Transfer Mode.
Interrupt Data Transfer Mode.
Acknowledge.
Retries.
Data rate throttle.

An embodiment of the invention utilizing CWUSB can utilize CWUSB protocol features as part of the CWUSB Device 125 and the CWUSB Host 145 as follows:

Acknowledge/Retries bounded by maximum latency.
MAC/PHY error analysis by the WAM Host 30.
Application-specific ECC utilized by the WAM Host 30, adapting the ECC to the system error characteristics and content bandwidth requirements.
WAM Host 30 processing of data transmission error reports from WAM Device 20 to decide appropriate levers to pull.
Data rate throttling to most reliable transmission rate, such as downshift to 53.3 Mb/s by the WAM Host 30 if 110 Mb/s bandwidth is unnecessary and a 53.3 Mb/s rate is more reliable.
Data rate throttling via sample rate conversion (½, ¼) by the WAM Host 30 on a device-by-device basis. Lower sampling rates for Surround and LFE channels are good choices, as the reduction in audio fidelity on these channels will be less noticeable.
Further data rate throttling can be achieved by reducing the audio bits/sample (bps) from, for example, 24 to 16 bps. This can also be done on a device-specific basis.
Dynamically disable/re-enable devices with high error rates, and automatically reconfigure the audio sent to the reliable speakers (i.e., WAM Devices 20) to effectively carry the audio that was meant to be played from the temporarily disabled devices. Smooth muting and restarting of the audio to error-prone WAM Devices 20 is essential to the effective concealment of their temporary absence from the system.

The above description shows the approaches that can be taken to overcome an error-prone medium, such as a CWUSB link, and achieve high performance digital audio reproduction.

Alternatively, embodiments of the invention can be applied to HomePlug or other wired interfaces with sufficient bandwidth capabilities.

In the foregoing specification, the invention has been described with reference to specific exemplary embodiments thereof. It will, however, be evident that various modifications and changes may be made thereto without departing from the broader spirit and scope of the invention. The specification and drawings are, accordingly to be regarded in an illustrative rather than a restrictive sense.

What is claimed is:

1. An apparatus comprising:
a wireless WiMedia Ultra-Wideband (UWB) link between a host and a device to transmit data including encoded audio data from the host to the device in a manner controlled dynamically to adapt to variable wireless error rates;
error processing algorithms included on the host, the error processing algorithms including forward error correction coding (FECC), the error processing algorithms configured, upon detection of an audio data error from the device, to log specific characteristics of the audio data error, to dynamically choose among a plurality of error recovery algorithms based on a plurality of statistics, to execute a chosen error recovery algorithm, and to retry transmission of the encoded audio data if the chosen error recovery algorithm corrects the audio data error; and
circuitry configured to vary a transmission rate between the host and the device.

2. The apparatus of claim 1, wherein the wireless WiMedia UWB link further comprises:
circuitry to send data transfer error information from the device to the host;
circuitry to dynamically control a method of transmission of the encoded audio data from the host to the device in response to the data transfer error information.

3. The apparatus of claim 2, wherein the circuitry to dynamically control the method of transmission of the encoded audio data comprises:
data encoding format circuitry;
synchronization circuitry;
latency circuitry; and
transmission rate circuitry including the circuitry configured to vary a transmission rate between the host and the device.

4. The apparatus of claim 2, further comprising:
circuitry to provide graceful muting and restart of the device in response to the data transfer error information.

5. The apparatus of claim 1, wherein the wireless WiMedia UWB link comprises a Certified Wireless Universal Serial Bus circuitry that includes WiMedia Ultra-Wideband radio circuitry.

6. The apparatus of claim 1, wherein the host includes an audio receiver and the device includes an audio speaker.

7. The apparatus of claim 1, wherein the host includes an audio/video receiver and the device includes an audio speaker.

8. The apparatus of claim 1, wherein the FECC is specifically configured for the wireless WiMedia UWB link and for a data payload that includes uncompressed audio.

9. The apparatus of claim 1, wherein the error processing algorithms utilize the FECC only when an error can be corrected using the FECC.

10. The apparatus of claim 9, wherein the error processing algorithms utilize audio error concealment the when the error cannot be corrected utilizing the FECC.

11. The apparatus of claim 10, wherein the audio error concealment includes graceful muting and restart of the audio data.

12. An apparatus comprising:
a bidirectional wireless WiMedia Ultra-Wideband (UWB) link to transmit digital audio data between a first device and a second device in a manner controlled dynamically to adapt to wireless error rates, wherein at least one of the first device and the second device comprises error processing software configured upon detection of an audio data error in the digital audio data transmitted from the first or second device,
to log specific characteristics of the audio data error,
to dynamically choose among a plurality of error recovery algorithms based on a plurality of statistics,
to execute a chosen error recovery algorithm, and
to retry transmission of the digital audio data if the chosen error recovery algorithm corrects the audio data error; and
circuitry configured to vary a transmission rate between the first device and the second device.

13. The apparatus of claim 12, wherein the bidirectional wireless WiMedia UWB link further comprises:
circuitry to send data transfer error information from the second device to the first device;
circuitry to dynamically control a method of transmission of the digital audio data from the first device to the second device in response to the data transfer error information.

14. The apparatus of claim 13, wherein the circuitry to dynamically control the method of transmission of the digital audio data comprises:
data encoding format circuitry;
synchronization circuitry;
latency circuitry; and
transmission rate circuitry including the circuitry configured to vary a transmission rate between the first device and the second device.

15. The apparatus of claim 13, further comprising:
circuitry to provide graceful muting and restart of the second device in response to the data transfer error information.

16. The apparatus of claim 12, wherein the bidirectional wireless WiMedia UWB link comprises a Certified Wireless Universal Serial Bus circuitry that includes WiMedia Ultra-Wideband radio circuitry.

17. The apparatus of claim 12, wherein the first device includes an audio receiver and the second device includes an audio speaker.

18. The apparatus of claim 12, wherein the first device includes an audio/video receiver and the second device includes an audio speaker.

19. The apparatus of claim 12, wherein the error processing software includes forward error correction coding (FECC).

20. The apparatus of claim 19, wherein the error processing software utilizes the FECC only when an error can be corrected using the FECC.

* * * * *